United States Patent
Liu et al.

(10) Patent No.: US 11,041,495 B2
(45) Date of Patent: Jun. 22, 2021

(54) POSITIVE DISPLACEMENT COMPRESSOR AND DAMPER BEARING SYSTEM

(71) Applicant: INGERSOLL-RAND INDUSTRIAL U.S., INC., Davidson, NC (US)

(72) Inventors: Yi Liu, Concord, NC (US); Blake Leary, Charlotte, NC (US); Xiao Jun Li, Shanghai (CN); Yun Feng Zhang, Shanghai (CN)

(73) Assignee: INGERSOLL-RAND INDUSTRIAL U.S., INC., Davidson, NC (US)

( * ) Notice: Subject to any disclaimer, the term of this patent is extended or adjusted under 35 U.S.C. 154(b) by 236 days.

(21) Appl. No.: 15/847,032

(22) Filed: Dec. 19, 2017

(65) Prior Publication Data

US 2019/0186492 A1    Jun. 20, 2019

(51) Int. Cl.

| | |
|---|---|
| *F16C 19/06* | (2006.01) |
| *F16C 27/04* | (2006.01) |
| *F04C 29/00* | (2006.01) |
| *F04C 27/00* | (2006.01) |
| *F16F 15/02* | (2006.01) |

(Continued)

(52) U.S. Cl.
CPC ........ *F04C 29/0021* (2013.01); *F04C 27/008* (2013.01); *F04C 29/02* (2013.01);
(Continued)

(58) Field of Classification Search
CPC .... F16C 19/06; F16C 27/045; F16C 32/0644; F16C 2360/23; F16C 2360/43; F16C 32/06; F02C 7/06; F02B 37/04; F02B 67/10; F02B 39/10; F01D 25/22; F01D 25/164; F15F 15/0237; F04C 29/0021; F04C 29/025; F04C 2240/54; F04C 2240/60;
(Continued)

(56) References Cited

U.S. PATENT DOCUMENTS

| | | | |
|---|---|---|---|
| 4,440,456 A | | 4/1984 | Klusman |
| 4,669,893 A | * | 6/1987 | Chalaire ............... F16C 27/045 |
| | | | 384/99 |

(Continued)

FOREIGN PATENT DOCUMENTS

| | | | | |
|---|---|---|---|---|
| JP | 2006038209 A | * | 2/2006 | ............. F16C 25/08 |
| JP | 2013007454 A | * | 1/2013 | ............ F16C 35/077 |

*Primary Examiner* — Marcus Charles
(74) *Attorney, Agent, or Firm* — Kevin E. West; Advent, LLP

(57) ABSTRACT

A positive displacement compressor includes a positive displacement compressor rotor; a shaft operative to support the positive displacement compressor rotor; a bearing operative to support the shaft; a first structure having a first squeeze film compression surface; and a second structure having a second squeeze film compression surface spaced apart radially from the first squeeze film compression surface. The first and second structures are constructed to jointly form a squeeze film damper using the first and second squeeze film compression surfaces. The squeeze film damper is operative to provide squeeze film damping of vibrations. An annular oil discharge groove is disposed adjacent to a first end of the squeeze film damper. A first o-ring gland houses a circumferential-sealing o-ring disposed proximate to the first end of the squeeze film damper. A second o-ring gland houses a second circumferential-sealing o-ring disposed proximate to a second end of the squeeze film damper.

20 Claims, 1 Drawing Sheet

(51) Int. Cl.
F04C 29/02 (2006.01)
F16F 15/023 (2006.01)
F04C 18/16 (2006.01)

(52) U.S. Cl.
CPC ............ F16C 19/06 (2013.01); F16C 27/045 (2013.01); F16F 15/0237 (2013.01); *F04C 18/16* (2013.01); *F04C 2240/50* (2013.01); *F04C 2240/60* (2013.01); *F16C 2360/43* (2013.01)

(58) Field of Classification Search
CPC ............ F05D 2220/40; F05D 2240/20; F05D 2240/50; F16F 15/0237; F04D 2240/50
USPC ........ 384/99, 535, 581; 418/83, 88; 417/407
See application file for complete search history.

(56) References Cited

U.S. PATENT DOCUMENTS

| | | | | |
|---|---|---|---|---|
| 4,971,457 A * | 11/1990 | Carlson | ................ | F01D 25/164 384/581 |
| 5,071,262 A * | 12/1991 | Monzel | ................ | F01D 25/164 384/581 |
| 5,197,807 A * | 3/1993 | Kuznar | ................ | F01D 25/164 277/645 |
| 5,215,384 A * | 6/1993 | Maier | ................ | F16C 17/03 384/117 |
| 5,228,784 A | 7/1993 | Bobo | | |
| 7,066,651 B2 | 6/2006 | Nicholas et al. | | |
| 8,167,494 B2 * | 5/2012 | Gibbons | ................ | F01D 25/164 384/99 |
| 8,182,153 B2 * | 5/2012 | Singh | ................ | F01D 25/164 384/477 |
| 9,470,263 B2 * | 10/2016 | Savela | ................ | F16C 27/045 |
| 9,599,152 B2 | 3/2017 | Freeman et al. | | |
| 9,702,404 B2 * | 7/2017 | Smedresman | ................ | F16C 23/08 |
| 9,841,056 B2 * | 12/2017 | Snow | ................ | F16C 27/045 |
| 10,054,005 B1 * | 8/2018 | Pinera | ................ | F02B 37/04 |
| 2007/0086685 A1 * | 4/2007 | Klusman | ................ | F01D 25/125 384/99 |
| 2016/0040670 A1 * | 2/2016 | Pillis | ................ | F04C 29/0021 418/88 |

* cited by examiner

POSITIVE DISPLACEMENT COMPRESSOR AND DAMPER BEARING SYSTEM

TECHNICAL FIELD

The present application generally relates to positive displacement compressors and more particularly, but not exclusively, to positive displacement compressors and damper bearing systems

BACKGROUND

Positive displacement compressors of various types, e.g., screw compressors, remain an area of interest. Some existing systems have various shortcomings, drawbacks and disadvantages relative to certain applications. For example, in some positive displacement compressors, vibration may be reduced. Accordingly, there remains a need for further contributions in this area of technology.

SUMMARY

One embodiment of the present invention is a unique positive displacement compressor. Another embodiment is a unique screw compressor. Another embodiment is a unique damper bearing system. Other embodiments include apparatuses, systems, devices, hardware, methods, and combinations for positive displacement compressors with damper bearing systems. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
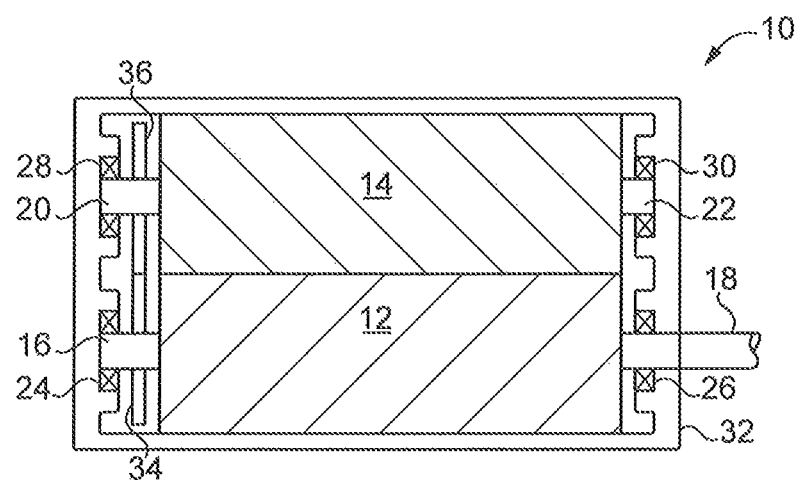
FIG. 1 schematically illustrates some aspects of a non-limiting example of a positive displacement compressor in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a positive displacement compressor 10 are illustrated in accordance with an embodiment of the present invention. In one form, positive displacement compressor 10 is a rotary screw compressor, e.g., a dual screw compressor. In other embodiments, positive displacement compressor 10 may be, for example, a single screw compressor or a roots blower. As used herein, a positive displacement compressor is any type of positive displacement compressor, positive displacement blower or positive displacement pump. In one form, positive displacement compressor 10 includes a driving rotor 12 and a driven rotor 14. Driving rotor 12 and driven rotor 14 are supported by respective shafts 16, 18 and 20, 22. Shafts 16, 18, 20 and 22 may be integral with rotors 12, 14, or may be separate components affixed or mounted onto rotors 12, 14. Shafts 16, 18, 20 and 22 are supported by bearings 24, 26, 28 and 30. Bearings 24, 26, 28 and 30 are supported by and transmit bearing loads to a static bearing support structure, e.g., a portion of a housing 32 that houses rotors 12 and 14, or a static structure attached to housing 32. In one form, bearings 24, 26, 28 and 30 are rolling element bearings. In other embodiments, one or more of bearings 24, 26, 28 and 30 may be other types of bearings.

Driving rotor 12 is supplied with shaft power via a shaft power source, such as an electric motor (not shown). Driving rotor 12 is operative to drive driven rotor 14 via gears 34 and 36. Gears 34 and 36 are mounted on respective shafts 16 and 20 of respective driving and driven rotors 12 and 14, and are in mesh with each other. Gears 34 and 36 are operative to transmit rotational motion from driving rotor 12 to driven rotor 14. In various embodiments, a plurality of seals (not shown) may be employed to prevent the leakage of oil and/or compressed gas into undesired portions of positive displacement compressor 10.

During operation, under some operating conditions, an undesirable amount of vibration may occur, e.g., at motor drive end ball bearing 26. The vibration may be due to, for example, structural resonance of a rotor-bearing-support system. In various embodiments, the vibration may be initially caused by misalignment between the drive motor shaft and the input shaft 18 of positive displacement compressor 10 and/or may stem from imbalance loads. Although it may be possible to alter the resonant characteristics of the rotor-bearing-support system, e.g., by performing a redesign to move the resonant frequency out of the frequency range of concern, doing so may require undesirable modifications to the geometry of one or both rotors, changes in bearing configuration or housing structure that supports the bearing. Also, for variable speed units, the unit operates across a wide range of frequencies, and it may be difficult to move the resonant frequency outside of such a wide range. Accordingly, embodiments of the present invention employ a squeeze film damper in order to provide squeeze film damping to reduce the vibration level when the rotor-bearing-support system is at or near a resonant frequency. This reduces the vibration on housing 32, reduces the forces operating on the damped bearing and potentially other bearings, and in some embodiments, increases the operational life of positive displacement compressor 10.

In various embodiments, the squeeze film damper provides viscous damping in rotating systems, isolates the structural vibration, reduces the amplitudes of the rotor lateral or radial vibration response, and suppresses rotor dynamic instability.

Figure 2:
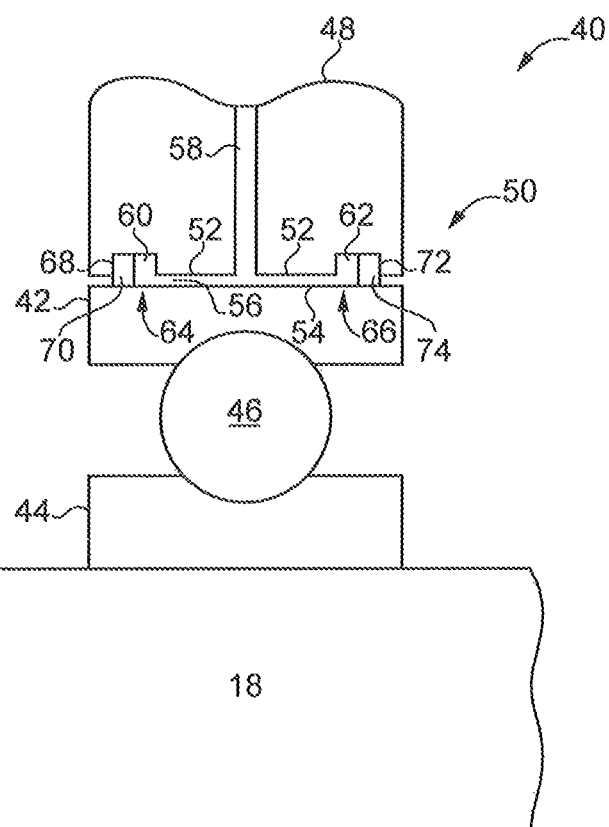
FIG. 2 schematically illustrates some aspects of a non-limiting example of a damper bearing system in accordance with an embodiment of the present invention.

Referring to FIG. 2, some aspects of a non-limiting example of a damper bearing system 40 in accordance with an embodiment of the present invention is schematically illustrated. Damper bearing system 40 includes a bearing, such as bearing 26, which may be, for example, a ball bearing. In other embodiments, bearing 26 may take other forms. Bearing 26 includes, for example, a journal or outer race 42, an inner race 44 mounted on shaft 18, a plurality of balls 46 disposed between outer race 42 and inner race 44, and a bearing cage or ball separator (not shown) operative to keep the balls 46 at a desired circumferential spacing about bearing 26. Bearing 26 is supported by a static bearing support structure 48, which, for example, may be part of housing 32 or may be affixed to housing 32.

Damper bearing system 40 also includes a squeeze film damper 50. For example, bearing support structure 48 includes a squeeze film compression surface 52 as an inner surface of bearing support structure 48. Outer race 42 includes a squeeze film compression surface 54, which in one form is an outer surface of outer race 42, e.g., the outer diameter of outer race 42. Bearing support structure 48 and outer race 42 are constructed to jointly form squeeze film damper 50 using squeeze film compression surface 52 and squeeze film compression surface 54. Squeeze film damper 50 includes a damping cavity 56 defined between squeeze film compression surface 52 and squeeze film compression surface 54. Squeeze film compression surface 52 and squeeze film compression surface 54 are spaced apart from each other radially to form the damping cavity 56. In one form, damping cavity 56 is cylindrical. In other embodiments, squeeze film compression surfaces 52 and 54 may be constructed to form damping cavity 56 as a conical cavity or any other suitable shaped cavity, e.g., such as a body of revolution.

Squeeze film damper 50 is operative to provide squeeze film damping of vibrations passing through rolling element bearing 26 upon an orbital motion of outer race 42 relative to bearing support structure 48 during certain periods of lateral vibration, e.g., lateral vibration stemming from unbalance or other dynamic loads, which, for example, may undesirably occur at or near a resonant frequency of positive displacement compressor 10, e.g., a resonance of the rotor-bearing-support system. Damping is performed when oil, e.g., lubricating oil supplied to within damping cavity 56 is compressed between squeeze film compression surface 52 and squeeze film compression surface 54 during orbital motion of outer race 42 and thus squeeze film compression surface 52, generating a compression wavefront that progresses circumferentially around outer race 42 and bearing support structure 48 as outer race 42 orbits within bearing support structure 48, generating the squeeze film damping. The squeeze film damping may be generated based on, for example, the viscous and elastohydrodynamic properties of the oil.

Whereas bearing support structure 48 is a static structure, outer race 42 is a dynamic structure, owing to the fact that it orbits within bearing support structure 48, e.g., during periods of vibration. Outer race 42 is thus in motion during at least some operating conditions, and hence is referred to as being a dynamic structure, whereas bearing support structure 48 is not in motion during operation, but rather, is stationary, and hence is referred to as a static structure.

Squeeze film damper 50 is supplied with oil via an oil feed hole or passage 58 located in bearing support structure 48, in approximately the axial center of damping cavity 56, between the ends of squeeze film damper 50, e.g., between the ends of the damping cavity 56 that holds the oil squeeze film, wherein the squeeze film damping takes place. Squeeze film damper 50 includes annular oil discharge grooves 60, 62 disposed immediately adjacent to and defining the first and second ends 64, 66 of squeeze film damper 50, e.g., at the ends of the small radial gap between squeeze film compression surface 52 and squeeze film compression surface 54 that together define the damping cavity 56 that holds the oil squeeze film, wherein the squeeze film damping takes place. Annular oil discharge grooves 60, 62 are operative to collect oil from squeeze film damper 50 for discharge away from squeeze film damper 50. Annular oil discharge grooves 60, 62 are formed in static bearing support structure 48.

An o-ring gland 68 for an o-ring 70 is disposed in static bearing support structure 48 proximate to end 64 of the squeeze film damper 50. O-ring 70 is a circumferential-sealing o-ring. A circumferential-sealing o-ring seals with its outer or inner diameter against the mating component disposed opposite the o-ring gland, e.g., against outer race 42. In contrast, a face-sealing o-ring seals along a side-facing surface of the o-ring against the mating component disposed opposite the o-ring gland.

An o-ring gland 72 houses a circumferential-sealing o-ring 74 is disposed in static bearing support structure 48 proximate to end 66 of the squeeze film damper 50. In some embodiments, annular oil discharge grooves 60, 62 are integral with respective o-ring glands 68, 72, e.g., formed as part of a common groove or annular passage within bearing support structure 48. In other embodiments, oil discharge grooves 60, 62 may be spaced apart from o-ring glands 68, 72.

In one form, oil is discharged from damping cavity 56 into discharge grooves 60, 62, and exits discharge grooves 60, 62 as leakage past o-rings 70, 74. For example, in some embodiments, o-ring glands 68, 72 and o-rings 70, 74 are sized and constructed to permit a slight leakage flow of oil past o-rings 70, 74 under certain dynamic conditions, to allow oil to flow through squeeze film damper 50. For instance, in some such embodiments and under some operating conditions, the motion of outer race 42 reduces the sealing effectiveness of o-rings 70 and 74, allowing small amounts of leakage past o-rings 70 and 74, which allows oil to flow through squeeze film damper 50, e.g., flushing out any air bubbles that may have been introduced within damping cavity 56, such as during assembly or shipping. In other embodiments, bearing support structure 48 may include one or more holes or passages (not shown) for discharging oil from discharge grooves 60, 62, to allow oil to flow through squeeze film damper 50. The passages may include, for example, discharge orifices sized to achieve a desired pressure within damper cavity 56 or a desired pressure drop across squeeze film damper 50.

Some embodiments may employ an anti-rotation device, such as an anti-rotation pin (not shown), e.g., pressed into bearing support structure 48 and disposed in a slot in outer race 42 (not shown), to secure outer race 42 against rotation, while sill allowing orbital motion of outer race 42 in response to vibration of rotor 12, shaft 18 and bearing 26.

Embodiments of the present invention include a damper bearing system, comprising: a rolling element bearing; a first structure having a first squeeze film compression surface; a second structure having a second squeeze film compression surface spaced apart radially from the first squeeze film compression surface, the first structure and the second structure being constructed to jointly form a squeeze film damper using the first squeeze film compression surface and the second squeeze film compression surface, the squeeze film damper being operative to provide squeeze film damping of vibrations passing through the rolling element bearing upon an orbital motion of the second structure relative to the first structure; an annular oil discharge groove disposed at a first end of the squeeze film damper, wherein the oil discharge groove is operative to collect oil for discharge from the squeeze film damper; a first o-ring gland housing a first circumferential-sealing o-ring disposed proximate to the first end of the squeeze film damper; and a second o-ring gland housing a second circumferential-sealing o-ring disposed proximate to a second end of the squeeze film damper.

In a refinement, the annular oil discharge groove is integral with the first o-ring gland.

In another refinement, the damper bearing system further comprises another annular oil discharge groove integral with the second o-ring gland.

In yet another refinement, the second structure is an outer race of the rolling element bearing; and the second compression surface is an outer surface of the outer race.

In still another refinement, the first structure is a static bearing support structure; wherein the first compression surface is an internal surface of the static bearing support structure, and wherein the first o-ring gland, the second o-ring gland and the annular oil discharge groove are disposed in the static bearing support structure.

In yet still another refinement, the squeeze film damper includes a cylindrical damping cavity defined between the first squeeze film compression surface and the second squeeze film compression surface.

In a further refinement, the damper bearing system further comprises an oil feed hole disposed in the first structure between the first end and the second end and operative to supply oil to the squeeze film damper.

Embodiments of the present invention include a positive displacement compressor, comprising: a positive displacement compressor or pump rotor; a shaft operative to support, at least in part, the positive displacement compressor or pump rotor; a bearing operative to support the shaft; a first structure having a first squeeze film compression surface; a second structure having a second squeeze film compression surface spaced apart radially from the first squeeze film compression surface, the first structure and the second structure being constructed to jointly form a squeeze film damper using the first squeeze film compression surface and the second squeeze film compression surface, the squeeze film damper being operative to provide squeeze film damping of vibrations passing through the rolling element bearing upon an orbital motion of the second structure relative to the first structure; an annular oil discharge groove disposed adjacent to a first end of the squeeze film damper, wherein the oil discharge groove is operative to collect oil for discharge from the squeeze film damper; a first o-ring gland housing a first circumferential-sealing o-ring disposed proximate to the first end of the squeeze film damper; and a second o-ring gland housing a second circumferential-sealing o-ring disposed proximate to a second end of the squeeze film damper.

In a refinement, the first structure is a static bearing support structure, and the second structure is a dynamic structure.

In another refinement, the bearing is a rolling element bearing; wherein the second structure is an outer race of the rolling element bearing; and wherein the second compression surface is an outer surface of the outer race.

In yet another refinement, the annular oil discharge groove is integral with the first o-ring gland.

In still another refinement, the positive displacement compressor further comprises another annular oil discharge groove integral with the second o-ring gland.

In yet still another refinement, the squeeze film damper includes a cylindrical damping cavity.

In a further refinement, the positive displacement compressor further comprises an oil feed hole disposed in the first structure between the first end and the second end and operative to supply oil to the squeeze film damper.

Embodiments of the present invention include a screw compressor, comprising: a rotating screw compressor rotor operative to compress a gas; a shaft operative to support, at least in part, the rotating screw compressor rotor; a rolling element bearing operative to support the shaft; a first structure having a first squeeze film compression surface; a second structure having a second squeeze film compression surface spaced apart radially from the first squeeze film compression surface, the first structure and the second structure being constructed to jointly form a squeeze film damper using the first squeeze film compression surface and the second squeeze film compression surface, the squeeze film damper being operative to provide squeeze film damping of vibrations passing through the rolling element bearing upon an orbital motion of the second structure relative to the first structure; an annular oil discharge groove disposed adjacent to a first end of the squeeze film damper, wherein the oil discharge groove is operative to collect oil for discharge from the squeeze film damper, a first o-ring gland housing a first circumferential-sealing o-ring disposed proximate to the first end of the squeeze film damper; and a second o-ring gland housing a second circumferential-sealing o-ring disposed proximate to a second end of the squeeze film damper.

In a refinement, the first structure is a static bearing support structure, and the second structure is a dynamic structure.

In another refinement, the bearing is a rolling element bearing; wherein the second structure is an outer race of the rolling element bearing; and wherein the second compression surface is an outer surface of the outer race.

In another refinement, the annular oil discharge groove is integral with the first o-ring gland.

In yet another refinement, the screw compressor further comprises another annular oil discharge groove integral with the second o-ring gland.

In still another refinement, the squeeze film damper includes a cylindrical damping cavity, and the screw compressor further comprises an oil feed hole disposed in the first structure and operative to feed oil into the cylindrical damping cavity between the first end and the second end of the squeeze film damper.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A damper bearing system, comprising:
   a rolling element bearing;
   a first structure having a first squeeze film compression surface;
   a second structure having a second squeeze film compression surface spaced apart radially from the first squeeze film compression surface, the first structure and the second structure being constructed to jointly form a squeeze film damper using the first squeeze film compression surface and the second squeeze film compression surface, the squeeze film damper being operative to provide squeeze film damping of vibrations passing through the rolling element bearing upon an orbital motion of the second structure relative to the first structure;
   an annular oil discharge groove disposed at a first end of the squeeze film damper, wherein the oil discharge groove is operative to collect oil for discharge from the squeeze film damper;
   a first o-ring gland housing a first circumferential-sealing o-ring disposed proximate to the first end of the squeeze film damper; and
   a second o-ring gland housing a second circumferential-sealing o-ring disposed proximate to a second end of the squeeze film damper;
   wherein the first circumferential-sealing o-ring defines a first o-ring inner diameter, the first o-ring inner diameter sealing against the second squeeze film compression surface of the second structure, and wherein the second circumferential-sealing o-ring defines a second o-ring inner diameter, the second o-ring inner diameter sealing against the second squeeze film compression surface of the second structure.

2. The damper bearing system of claim 1, wherein the annular oil discharge groove is integral with the first o-ring gland.

3. The damper bearing system of claim 2, further comprising another annular oil discharge groove integral with the second o-ring gland.

4. The damper bearing system of claim 1, wherein the second structure is an outer race of the rolling element bearing; and wherein the second compression surface is an outer surface of the outer race.

5. The damper bearing system of claim 1, wherein the first structure is a static bearing support structure; wherein the first compression surface is an internal surface of the static bearing support structure, and wherein the first o-ring gland, the second o-ring gland and the annular oil discharge groove are disposed in the static bearing support structure.

6. The damper bearing system of claim 1, wherein the squeeze film damper includes a cylindrical damping cavity defined between the first squeeze film compression surface and the second squeeze film compression surface.

7. The damper bearing system of claim 1, further comprising an oil feed hole disposed in the first structure between the first end and the second end and operative to supply oil to the squeeze film damper.

8. A positive displacement compressor apparatus, comprising:
   a positive displacement compressor or pump rotor;
   a shaft operative to support, at least in part, the positive displacement compressor or pump rotor;
   a bearing operative to support the shaft;
   a first structure having a first squeeze film compression surface;
   a second structure having a second squeeze film compression surface spaced apart radially from the first squeeze film compression surface, the first structure and the second structure being constructed to jointly form a squeeze film damper using the first squeeze film compression surface and the second squeeze film compression surface, the squeeze film damper being operative to provide squeeze film damping of vibrations passing through the rolling element bearing upon an orbital motion of the second structure relative to the first structure;
   an annular oil discharge groove disposed adjacent to a first end of the squeeze film damper, wherein the oil discharge groove is operative to collect oil for discharge from the squeeze film damper;
   a first o-ring gland housing a first circumferential-sealing o-ring disposed proximate to the first end of the squeeze film damper; and
   a second o-ring gland housing a second circumferential-sealing o-ring disposed proximate to a second end of the squeeze film damper;
   wherein the first circumferential-sealing o-ring defines a first o-ring inner diameter, the first o-ring inner diameter sealing against the second squeeze film compression surface of the second structure, and wherein the second circumferential-sealing o-ring defines a second o-ring inner diameter, the second o-ring inner diameter sealing against the second squeeze film compression surface of the second structure.

9. The positive displacement compressor apparatus of claim 8, wherein the first structure is a static bearing support structure, and wherein the second structure is a dynamic structure.

10. The positive displacement compressor apparatus of claim 9, wherein the bearing is a rolling element bearing; wherein the second structure is an outer race of the rolling element bearing; and wherein the second compression surface is an outer surface of the outer race.

11. The positive displacement compressor apparatus of claim 8, wherein the annular oil discharge groove is integral with the first o-ring gland.

12. The positive displacement compressor apparatus of claim 11, further comprising another annular oil discharge groove integral with the second o-ring gland.

13. The positive displacement compressor apparatus of claim 8, wherein the squeeze film damper includes a cylindrical damping cavity.

14. The positive displacement compressor apparatus of claim 8, further comprising an oil feed hole disposed in the first structure between the first end and the second end and operative to supply oil to the squeeze film damper.

15. A screw compressor, comprising:
   a rotating screw compressor rotor operative to compress a gas;
   a shaft operative to support, at least in part, the rotating screw compressor rotor;
   a rolling element bearing operative to support the shaft;
   a first structure having a first squeeze film compression surface;
   a second structure having a second squeeze film compression surface spaced apart radially from the first squeeze film compression surface, the first structure and the second structure being constructed to jointly form a squeeze film damper using the first squeeze film compression surface and the second squeeze film compression surface, the squeeze film damper being operative to provide squeeze film damping of vibrations passing through the rolling element bearing upon an orbital motion of the second structure relative to the first structure;

an annular oil discharge groove disposed adjacent to a first end of the squeeze film damper, wherein the oil discharge groove is operative to collect oil for discharge from the squeeze film damper;

a first o-ring gland housing a first circumferential-sealing o-ring disposed proximate to the first end of the squeeze film damper; and a second o-ring gland housing a second circumferential-sealing o-ring disposed proximate to a second end of the squeeze film damper;

wherein the first circumferential-sealing o-ring defines a first o-ring inner diameter, the first o-ring inner diameter sealing against the second squeeze film compression surface of the second structure, and wherein the second circumferential-sealing o-ring defines a second o-ring inner diameter, the second o-ring inner diameter sealing against the second squeeze film compression surface of the second structure.

16. The screw compressor of claim 15, wherein the first structure is a static bearing support structure, and wherein the second structure is a dynamic structure.

17. The screw compressor of claim 16, wherein the bearing is a rolling element bearing; wherein the second structure is an outer race of the rolling element bearing; and wherein the second compression surface is an outer surface of the outer race.

18. The screw compressor of claim 15, wherein the annular oil discharge groove is integral with the first o-ring gland.

19. The screw compressor of claim 18, further comprising another annular oil discharge groove integral with the second o-ring gland.

20. The screw compressor of claim 15, wherein the squeeze film damper includes a cylindrical damping cavity, further comprising an oil feed hole disposed in the first structure and operative to feed oil into the cylindrical damping cavity between the first end and the second end of the squeeze film damper.

* * * * *